Patented Apr. 26, 1932

1,855,328

UNITED STATES PATENT OFFICE

HERMANN WAGNER, OF BAD SODEN, GERMANY, OTTO SOHST, DECEASED, LATE OF HOCHST-ON-THE-MAIN, GERMANY, BY ADELE SOHST, ADMINISTRATRIX, OF HOCHST-ON-THE-MAIN, GERMANY, CARL SEIB, OF HOCHST-ON-THE-MAIN, GERMANY, AND WILHELM SCHUMACHER, OF SOSSENHEIM, GERMANY, ASSIGNORS TO GENERAL ANILINE WORKS, INC., OF NEW YORK, N. Y., A CORPORATION OF DELAWARE

AZO DYESTUFFS

No Drawing. Application filed March 15, 1928, Serial No. 262,036, and in Germany March 29, 1927.

The present invention relates to new azo dyestuffs.

We have found that valuable new dyestuffs are obtained, which can be produced in substance as well as on the fiber, by diazotizing an amine of the following formula:

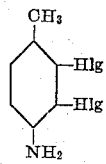

wherein Hlg represents a halogen atom and coupling the diazo-compound with an arylamide of 2-hydroxynaphthalene-3-carboxylic acid. The dyestuffs thus obtainable are remarkable for the beautiful tints they yield and their great fastness to kier-boiling and light.

The examples hereafter given serve to illustrate our invention, but they are not intended to limit it thereto; the method of dyeing being as follows:

50 grams of boiled-off yarn are treated as regards Examples 1 and 2 for one minute, in the respective grounding liquor, well hydroextracted by centrifugating and squeezing and then dyed for half an hour in the respective dye-bath. The material is then rinsed, soaped at boiling temperature with 2 grams of soap and 3 grams of sodium carbonate per liter and then again rinsed and dried.

*Example 1.*—The yarn is treated with a grounding liquor prepared in the following manner:

8 grams of 2.3-hydroxynaphthoic acid-5-chlor-2-toluidide are dissolved in 500 cc. of boiling water with addition of 16 cc. of Turkey-red oil (50% strength) and 16 cc. of caustic soda solution of 34° Bé. The whole, after being cooled to nearly 50° C., is mixed with 8 cc. of formaldehyde of 30% strength, and made up with water to one liter. The material is impregnated with this liquor and then coupled with a diazo solution prepared in the following manner:

3.55 grams of 2.3-dichlor-4-amino-1-methylbenzene are mixed and stirred with 5.2 cc. of hpdrochloric acid of 22° Bé. and some ice-cold water and there are then added 1.44 grams of sodium nitrite dissolved in water. After the mixture has thus been diazotized, it is made up with cold water to one liter and the mineral acid is neutralized by means of sodium acetate.

The dyeing produced according to the above method is of a vivid bluish-red shade and of good fastness to kier-boiling and light. The dyestuff has the formula:

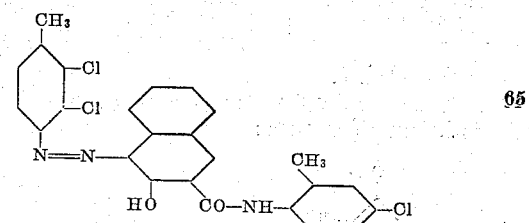

*Example 2.*—The cotton yarn is treated with a grounding liquor prepared in the following manner:

8 grams of 2.3-hydroxynaphthoic acid-5-chlor-2-anisidide are dissolved in 500 cc. of boiling water with addition of 16 cc. of Turkey-red oil (50% strength) and 16 cc. of caustic soda solution of 34° Bé. The whole, after being cooled to nearly 50° C., is mixed with 8 cc. of formaldehyde of 30% strength and made up with water to one liter. The material is impregnated with this liquor and then coupled with a diazo solution prepared in the following manner:

3.55 grams of 2.3-dichlor-4-amino-1-methylbenzene are mixed and stirred with 5.2 cc. of hydrochloric acid of 22° Bé. and some ice-cold water and there are then added 1.44 grams of sodium nitrate dissolved in water. After the mixture has thus been diazotized it is made up with cold water to one liter and the mineral acid is neutralized by means of sodium acetate.

By this method a pure bluish Turkey-red dyeing of good fastness to kier-boiling and light is obtained. The constitution of the dyestuff is as follows:

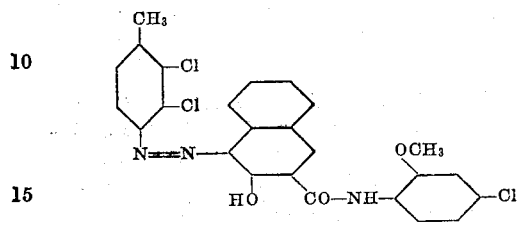

The following table shows the shades which are produced by some other dyestuffs of the new type, it does however not embrace the whole number of dyestuffs obtainable according to our invention:

| | | |
|---|---|---|
| 2.3-dichlor-4-amino-1-methylbenzene | 2.3-hydroxynaphthoic acid-anilide | Bluish-red |
| 2.3-dichlor-4-amino-1-methylbenzene | 2.3-hydroxynaphthoic acid-p-toluidide | Yellowish red |
| 2.3-dichlor-4-amino-1-methylbenzene | 2.3-hydroxynaphthoic acid-o-chloranilide | Deep red |
| 2.3-dichlor-4-amino-1-methylbenzene | 2.3-hydroxynaphthoic acid-m-nitranilide | Red |
| 2.3-dichlor-4-amino-1-methylbenzene | 2.3-hydroxynaphthoic acid-o-anisidide | Bluish-red |
| 2.3-dichlor-4-amino-1-methylbenzene | 2.3-hydroxynaphthoic acid-p-anisidide | Deep red |
| 2.3-dichlor-4-amino-1-methylbenzene | 2.3-hydroxynaphthoic acid-o-phenetidide | Clear scarlet |
| 2.3-dichlor-4-amino-1-methylbenzene | 2.3-hydroxynaphthoic acid-m-phenetidide | Clear scarlet red |
| 2.3-dichlor-4-amino-1-methylbenzene | 2.3-hydroxynaphthoic acid-4-chlor-2-anisidide | Deep red |
| 2.3-dichlor-4-amino-1-methylbenzene | 2.3-hydroxynaphthoic acid-2.5-dimethoxyanilide | Claret-red |
| 2.3-dichlor-4-amino-1-methylbenzene | 2.3-hydroxynaphthoic acid-β-naphthalide | Wine red |

We claim:
1. As a new product, the compound of the following formula:

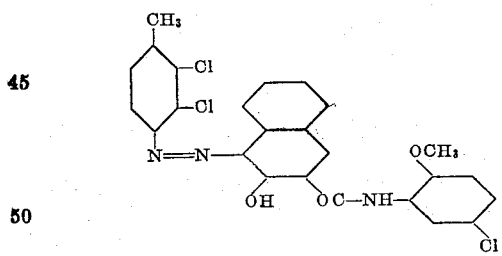

said compound giving a pure Turkey-red dyeing of very good fastness to light and to kier-boiling.

2. As new products the compounds of the following general formula:

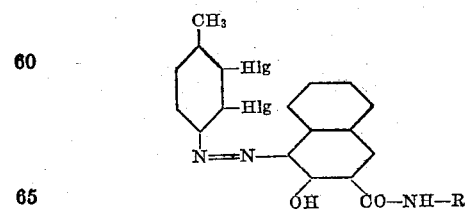

wherein Hlg represents a halogen atom and R stands for a phenyl or naphthyl residue which may be substituted by alkyl, alkoxy or halogen, said compounds giving dyeings of a bluish-red tint of good fastness to light and to bucking.

3. As new products the compounds of the following general formula:

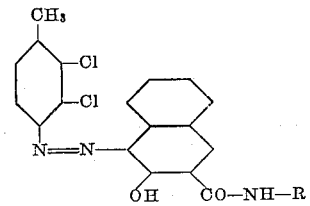

wherein R stands for a phenyl or naphthyl residue which may be substituted by alkyl, alkoxy or halogen, said compounds giving dyeings of a bluish-red tint of good fastness to light and to bucking.

4. As new products the compounds of the following general formula:

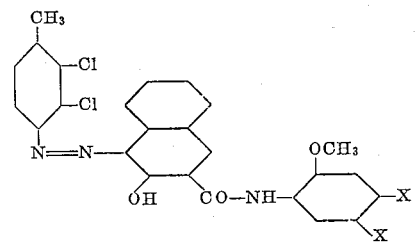

wherein one X represents chlorine, the other X stands for hydrogen, the said compounds giving dyeings of a bluish-red tint of good fastness to light and to bucking.

5. As a new product, the compound of the following formula:

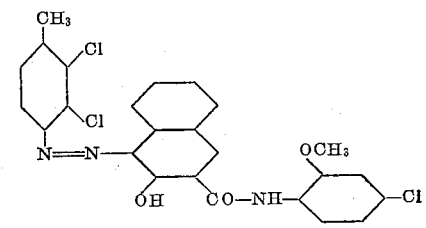

said compound giving a pure bluish Turkey-red dyeing of very good fastness to light and to kier-boiling.

In testimony whereof, we affix our signatures.

HERMANN WAGNER.
ADELE SOHST,
*Administratrix of Otto Sohst, Deceased.*
CARL SIEB.
WILHELM SCHUMACHER.